(12) United States Patent
Baldemair et al.

(10) Patent No.: US 8,526,933 B2
(45) Date of Patent: Sep. 3, 2013

(54) METHOD AND ARRANGEMENTS TO RECONFIGURE A RADIO BASE STATION IN A WIRELESS COMMUNICATION SYSTEM

(75) Inventors: Robert Baldemair, Solna (SE); Pål Frenger, Linköping (SE); Bo Hagerman, Tyresö (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 68 days.

(21) Appl. No.: 13/380,282

(22) PCT Filed: Jun. 23, 2009

(86) PCT No.: PCT/SE2009/050796
§ 371 (c)(1),
(2), (4) Date: Dec. 22, 2011

(87) PCT Pub. No.: WO2010/151185
PCT Pub. Date: Dec. 29, 2010

(65) Prior Publication Data
US 2012/0100844 A1    Apr. 26, 2012

(51) Int. Cl.
*H04M 3/00* (2006.01)

(52) U.S. Cl.
USPC ........... 455/418; 455/450; 455/434; 455/561; 455/447

(58) Field of Classification Search
USPC .................... 455/418, 450, 434, 561, 447
See application file for complete search history.

(56) References Cited

U.S. PATENT DOCUMENTS

2009/0005074 A1   1/2009   Kahn et al.
2010/0234028 A1*  9/2010   Narasimha et al. ........... 455/437
2010/0272017 A1* 10/2010   Terry et al. ...................... 370/328
2011/0294508 A1* 12/2011   Min et al. ....................... 455/436
2012/0034948 A1*  2/2012   Wang et al. ..................... 455/522

FOREIGN PATENT DOCUMENTS

| GB | 2328581 A | 2/1999 |
|----|-----------|--------|
| WO | WO 99/11088 | 3/1999 |
| WO | WO 02/07464 A1 | 1/2002 |

OTHER PUBLICATIONS

PCT Written Opinion of the International Searching Authority, mailed Mar. 10, 2010 for PCT International Application No. PCT/SE2009/050796, filed on Jun. 23, 2009.
PCT International Search Report, mailed Mar. 10, 2010 for PCT International Application No. PCT/SE2009/050796, filed on Jun. 23, 2009.
PCT International Preliminary Report on Patentability, mailed Jul. 18, 2011 for PCT International Application No. PCT/SE2009/050796, filed on Jun. 23, 2009.

* cited by examiner

*Primary Examiner* — Barry Taylor
(74) *Attorney, Agent, or Firm* — Myers Bigel Sibley & Sajovec, P.A.

(57) ABSTRACT

A Radio Base Station (RBS) and method of operating the same are provided. The RBS may enable a fast and flexible reconfiguration of the system from a first configuration to a second confirmation where the RBS is triggered to initiate a system reconfiguration and the reconfiguration is performed by starting a new cell with the wanted new configuration in parallel with the original cell. During a certain time period, both the original and the new cell are available. Thereafter, the original cell is shut down. The time offset between the start up of the new cell and the shut down of the original cell may be long enough to ensure that user equipment associated with the original cell can be handed over or can reselect the new cell. The time offset may be short enough to reduce the interference between the original and new cells.

20 Claims, 8 Drawing Sheets

METHOD AND ARRANGEMENTS TO RECONFIGURE A RADIO BASE STATION IN A WIRELESS COMMUNICATION SYSTEM

CROSS REFERENCE TO RELATED APPLICATIONS

This application is a 35 U.S.C. §371 national stage application of PCT International Application No. PCT/SE2009/050796, filed on 23 Jun. 2009, the disclosure and content of which is incorporated by reference herein in its entirety. The above-referenced PCT International Application was published in the English language as International Publication No. WO 2010/151185 A1 on 29 Dec. 2010.

TECHNICAL FIELD

The present invention relates to system reconfiguration. More particularly, the present invention relates to a radio base station, and to a method for changing from a first configuration to a second configuration.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The UMTS Terrestrial Radio Access Network (UTRAN) is the radio access network of a UMTS system and evolved UTRAN (E-UTRAN) is the radio access network of an LTE system. As illustrated in FIG. 1, an E-UTRAN typically comprises user equipments (UE) 150 wirelessly connected to radio base stations (RBS) 100, commonly referred to as eNodeB. The eNodeB serves an area referred to as a cell 110. An UE entering a cell needs to know the configuration information of that specific cell in order to be able to communicate with the eNodeB serving the cell. Such cell specific cell configuration information is typically broadcasted to all UEs in a cell.

In E-UTRAN, the configuration information of a cell is comprised in the System Information (SI). In order to minimize the resources needed for SI and the power consumption in the UE for reading SI, while still making it possible for the UE to read time critical SI without a significant delay, the SI is grouped in blocks that are broadcasted differently. These blocks are the Master Information Block (MIB) and several System Information Blocks (SIB) of different types, referred to as SIB1, SIB2 etc. The MIB is used to specify which SIBs that are in use in a cell and how they should be accessed. Each SIB contains a field specifying the block type and the actual SI elements, and may optionally also contain an expiration time and a value tag related to the values of the information elements in a SIB. The purpose of the expiration time and the value tag is to avoid an unnecessary re-reading of the SIBs. Examples of SI contained in SIBs are radio resource configuration information common for all UEs (in SIB2) and cell re-selection information common for intra-frequency, inter-frequency and/or inter-RAT cell re-selection (in SIB3).

Changes of SI only occur in specific radio frames. The time between the occurrence of these specific radio frames is referred to as the modification period. Depending on the configuration (e.g. on the length of the paging cycle) the modification period can be as long as 41 seconds. More than one modification period is typically required when the SI is changed. When the network changes parts of the SI, it first notifies the UEs about this change. This may typically be done throughout a first modification period. In the next modification period, the network transmits the updated SI. In order to notify UEs in idle mode as well as connected mode UEs in state CELL_PCH and URA_PCH about a SI change, a paging message is used. Some cell specific SI elements, such as neighbor cell relations, are updated relatively seldom, while other SI elements need to be updated periodically e.g. as a result of interference or traffic measurements.

However, in order to ensure that UEs always have valid SI, the SI elements may only change a few times per hour. The value tag in a SIB is an integer between 0 and 31, which indicates if a change has occurred in the SI elements. UEs may use the SIB value tag, e.g. upon return from out of coverage, to verify if the previously stored SI elements are still valid. In addition to checking the value tag, the UE also considers stored SI to be invalid after three hours from the moment it was successfully confirmed as valid, unless specified otherwise. As the value tag is restricted to an integer between 0 and 31, this implies that it is not safe to change the SI more than 31 times during three hours, i.e. approximately once every 6 minutes in average. Reconfigurations of a cell that require changes in at least one part of the SI is done via modification of the SI. Such a cell reconfiguration, e.g. a reduction of the cell bandwidth in order to lower power consumption, is thus a rather slow and inflexible process.

The number of transmit antennas is not encoded as a bit pattern in the SI, which means that the UEs cannot find out about the number of antennas through the payload of the SI. The RBS will instead choose a transmit format of the broadcast channel (BCH) which corresponds to the actual number of transmit antennas. However, the UEs are not informed about the transmit format of the BCH, and will have to detect it blindly. Once detected, the UEs will thus know how many transmit antennas that the RBS uses, and the UEs will be expecting a certain transmission format of the broadcast channel. A change of the number of transmit antennas is thus not possible without a restart of the cell, which would disturb ongoing traffic.

SUMMARY

The object of the present invention is to achieve a method and arrangement that obviate some of the above disadvantages and enable a faster and more flexible way of reconfiguring the system, e.g. of reconfiguring the number of transmit antennas or the bandwidth.

This object and others are achieved by the method and radio base station according to the appended independent claims, and by the embodiments according to the dependent claims.

In accordance with a first aspect of the present invention, a method for system reconfiguration in a radio base station is provided. The method enables changing from a first configuration to a second configuration, and comprises the steps of receiving a trigger initiating the reconfiguration of the system, determining the second configuration and starting up a second cell, before shutting down a first cell with the first configuration, by applying the second configuration. It also comprises the step of shutting down the first cell with a time offset relative to starting up the second cell.

In accordance with a second aspect of the present invention, a radio base station adapted to enable system reconfiguration by changing from a first configuration to a second configuration is provided. The radio base station comprises a receiving unit arranged to receive a trigger initiating the reconfiguration of the system, a determining unit arranged to determine a second configuration, and a start up unit arranged to start up a second cell, before shutting down a first cell with the first configuration, by applying the second configuration. It also comprises a shut down unit arranged to shut down the first cell with a time offset relative to starting up the second cell.

An advantage of embodiments of the present invention is that system reconfigurations such as a system bandwidth reconfiguration can be done in a faster and more flexible way than the conventional SI modification procedure allows.

A further advantage of embodiments of the present invention is that a reconfiguration of the number of transmit antennas is possible without having to restart the original cell and thereby disturb ongoing traffic.

Still another advantage of embodiments of the present invention is that it allows for power savings, as the system bandwidth or the number of transmit antennas may be reduced during periods of low traffic e.g. during night, in a flexible way.

DETAILED DESCRIPTION

Figure 1:
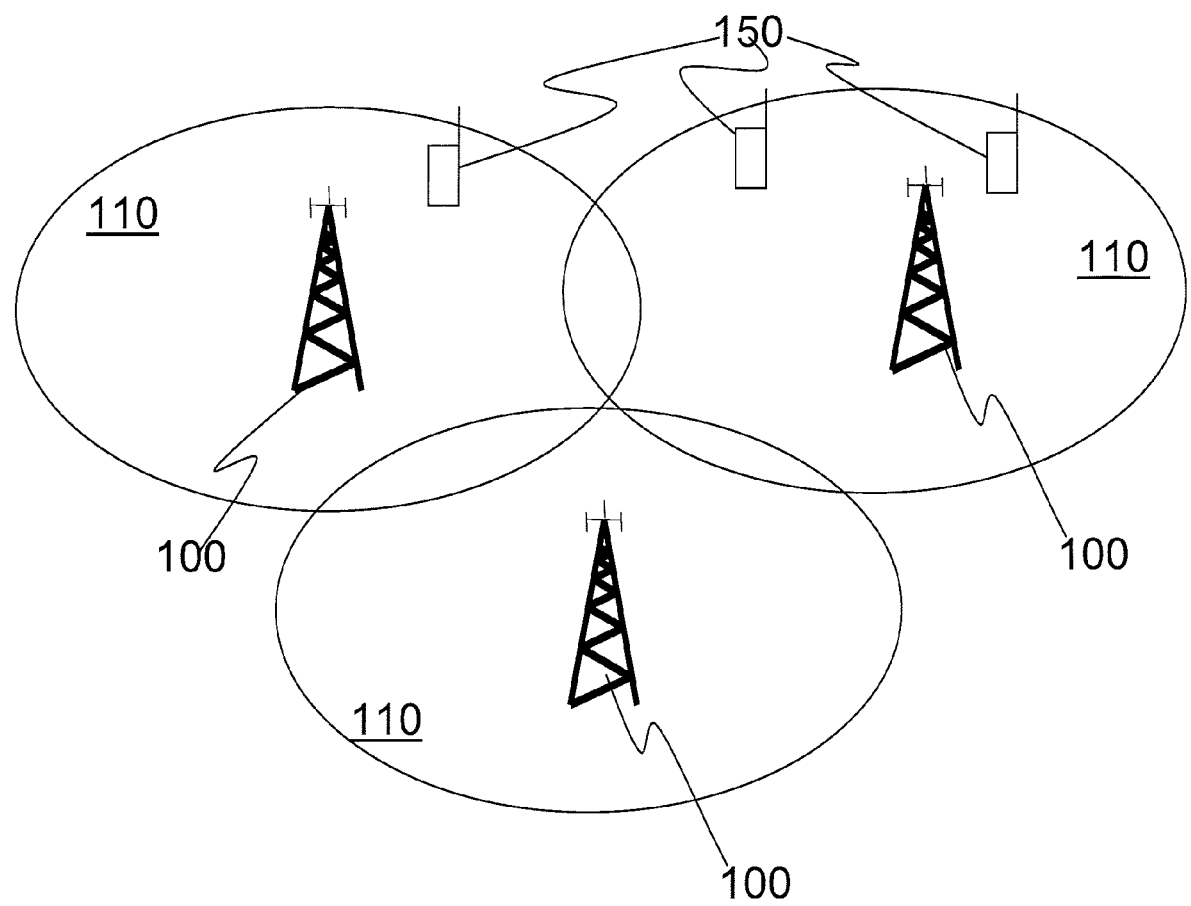
FIG. 1 illustrates schematically a part of a conventional wireless communication system wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP LTE system. It should though be noted that the invention and its exemplary embodiments may also be applied to other types of radio access technologies such as UTRAN, WiMax and coming releases of LTE.

In the present invention, the problem of the inflexible and slow process for system reconfiguration using SI modification, is addressed by a solution where the RBS is triggered to initiate a system reconfiguration, and the reconfiguration is performed by starting a new (or second) cell with the wanted new configuration in parallel with the original (or first) cell. During a certain time period, both the original and the new cell are available. Thereafter the original cell is shut down. The time offset between the start up of the new cell and the shut down of the original cell must be long enough to ensure that all UEs associated with the original cell (active, dormant or idle) can be handed over to or reselect the new cell. However, the time offset should also be short in order to minimize the interference between the original and the new cell.

In a first exemplary embodiment of the present invention, the RBS operates in an LTE system, and is thus referred to as an eNodeB. It has two antenna ports, each port connected to a transmitting antenna. Multi-antenna techniques can significantly increase the data rates and reliability of a wireless communication system. The performance is in particular improved if both the transmitter and the receiver are equipped with multiple antennas (multiple-input multiple-output (MIMO)). The drawback of multiple transmitting antennas is an increased power consumption due to that multiple power amplifiers are needed, one per transmission chain. A reconfiguration of the number of transmitting antennas during low traffic periods would thus be beneficial from a power saving perspective. In this first embodiment, the eNodeB receives a trigger to initiate a reconfiguration of the number of actively transmitting antennas. When the eNodeB is operating with two transmitting antennas, a reduction to one actively transmitting antenna may be performed in order to save power during a low load period. The number of antennas may later on be increased to two again, if the load situation so requires. Even though the RBS in this exemplary embodiment is configured with two transmit antennas, other configurations with more than two antennas may of course also be envisioned.

When receiving the trigger, the eNodeB will thus determine the new configuration, and will start up a new cell with this new configuration in parallel with the original cell. In the new configuration, the SI elements are affected by the number of transmitting antennas, and the broadcast channel of the new cell will have a transmit format that corresponds to the reconfigured number of transmit antennas, in order for the UEs to detect how many transmit antennas that are used (as described above). If the cell identity of the new cell differs from the cell identity of the old cell, the synchronization channels and the RS will also be affected.

Furthermore, by applying a time and/or frequency offset and selecting the cell identity of the new cell in a specific way, collisions of transmissions from the two cells can be avoided to a large extent. The new cell can thus be transmitted with the same transmission chain as the original cell, and via a same transmitting antenna. Any Physical Downlink Shared Channel (PDSCH) transmissions, which may be scheduled during the transition period from the original to the new cell, can be kept apart by using different time-frequency resources in the cells. This is possible as the reconfiguration is always done in a low traffic situation.

Figure 2A:
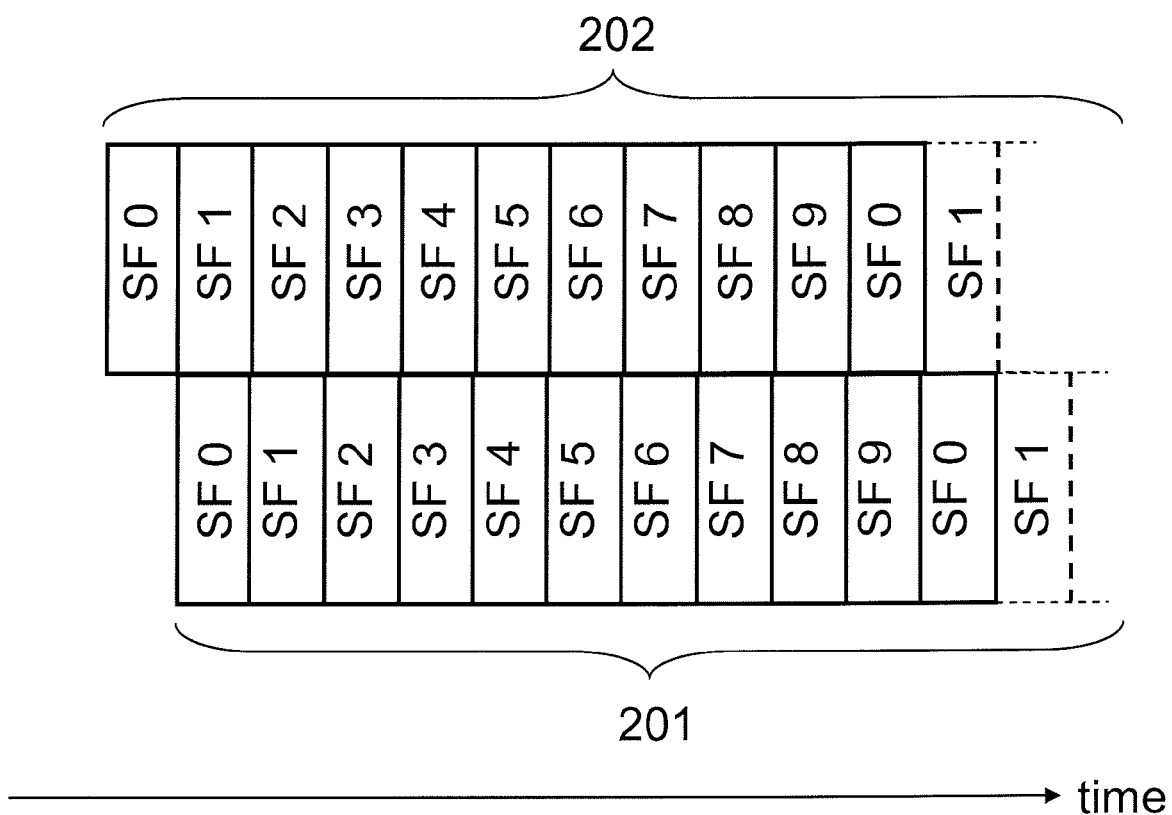
FIG. 2a illustrates schematically a time offset of one sub frame (SF) in the center resource block for both the original and the new cell.

FIG. 2a illustrates schematically the center resource block for both the original and the new cell, and how the new cell transmits its sub frames 201 with a time offset of one sub frame (SF) relative to the transmission of the original cell SF 202. In LTE frequency division duplex (FDD), the synchronization channel is transmitted in SF 0 and in SF 5 for each cell. By transmitting the SF of the new cell with a one SF time delay as shown in FIG. 2a, collisions of the synchronization channels of the original and of the new cell will be avoided.

Figure 2B:
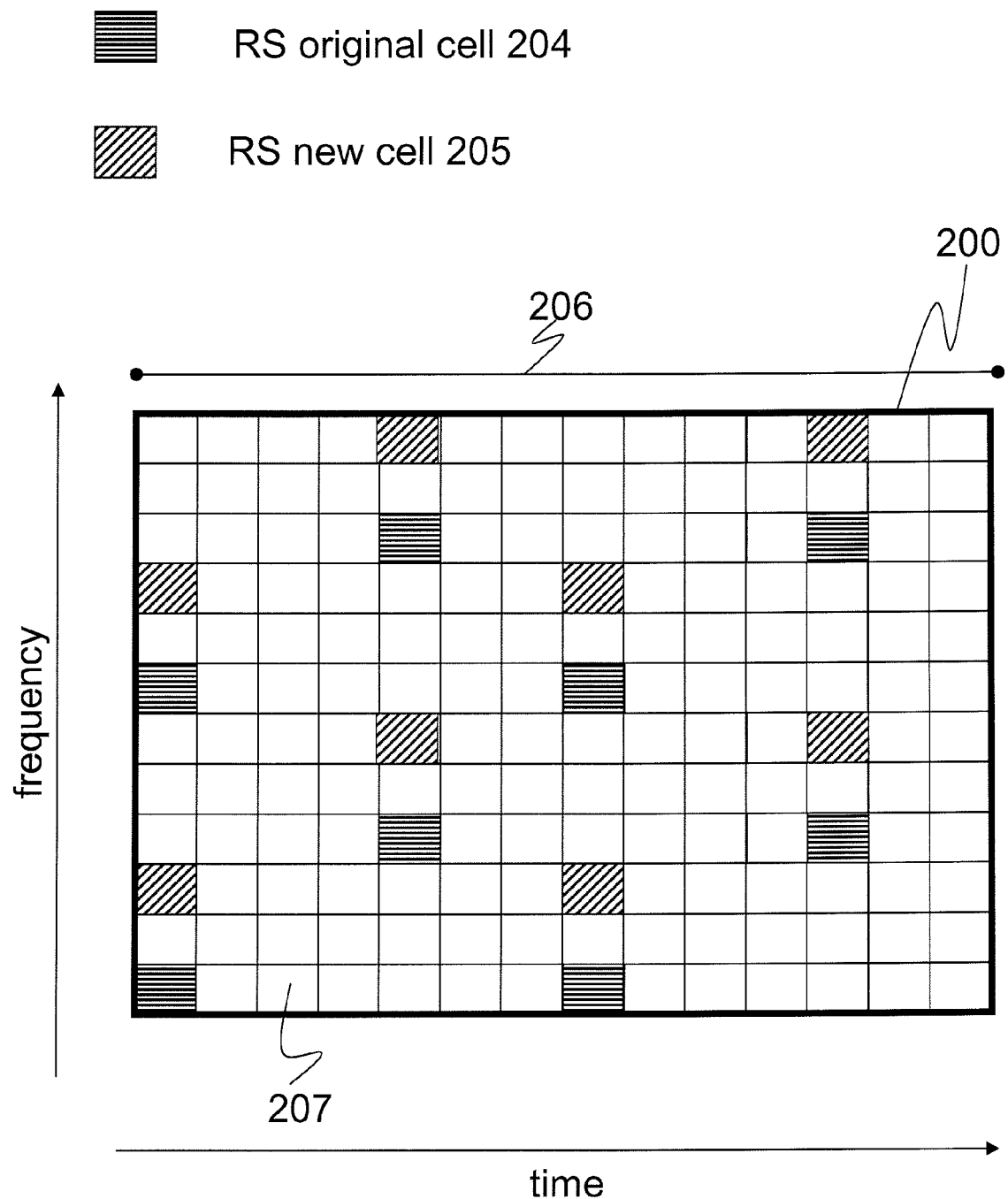
FIG. 2b-c illustrate schematically the time-frequency resource grid for one SF in time and one resource block in frequency of the original and the new cell transmitted over the same transmission chain.

The frequency position of reference signals (RS) for the same symbol within a SF and the same antenna port, are shifted by v_shift=N_cellid mod 6 relative to a common reference, where N_cellid is the cell identity. This is used when determining the cell identity to use for the new cell. By selecting a cell identity which results in different v_shift it is possible to avoid overlapping RS. If the original cell identity is 0, that would result in v_shift=0. The cell identity of the new cell should thus be selected to give v_shift≠0, e.g. cell identity 2 resulting in v_shift=2. As there is a RS for each transmitting antenna, the RS from all transmit antennas need to be considered in the case of a cell operating with multiple antennas. FIG. 2b illustrates schematically the time-frequency resource grid 200 for one SF 206 in time and one resource block in frequency of the original and the new cell transmitted over the same transmission chain. In this example, a time delay of one SF is applied as is illustrated in FIG. 2a, and the illustrated SF corresponds to SF 2 of the original cell and SF 1 of the new cell. In this example there is no PDSCH transmission scheduled in this SF. The only resource elements 207 of the resource grid 200 that are in use, are the ones used for the RS of the original cell 204 and RS of the new cell 205, and the cell identity of the new cell has been selected in a way that avoids collisions of the RS, according to the description above.

Figure 2C:
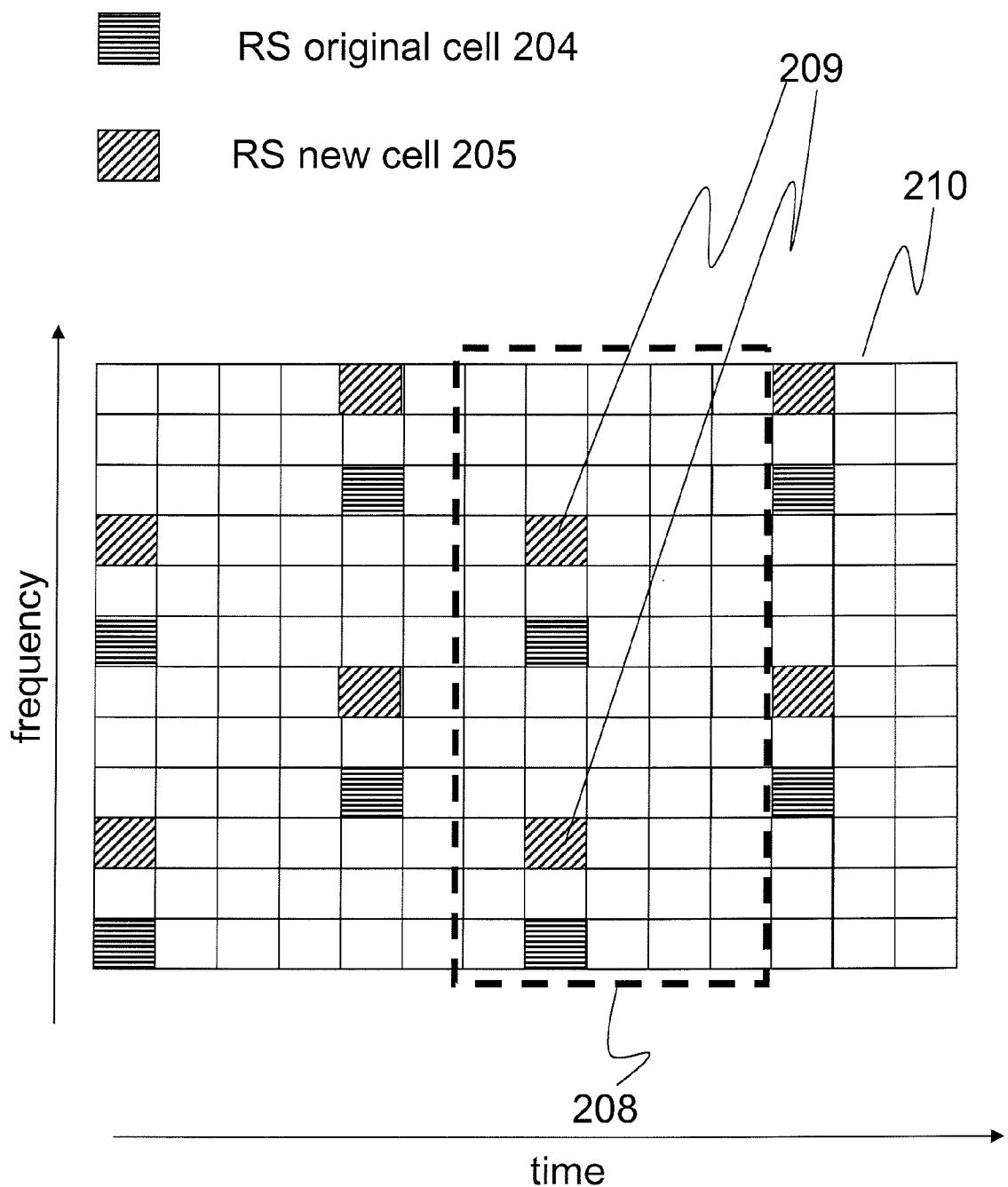

FIG. 2c illustrates schematically the time-frequency resource grid 210 corresponding to SF 0 in time and one resource block in frequency of the original cell and SF 9 in time of the new cell (the same time delay of one SF as in FIG. 2a is applied). As the synchronization channel and the MIB is transmitted in SF 0, a group of resource elements 208 will be used for the synchronization channel and the MIB of the original cell in this resource grid. In this resource grid, it is thus not possible to avoid collisions between transmissions for the two cells, as we have overlapping resource elements 209 when the new cell transmits its RS 205 and the original cell transmits the synchronization channel and the MIB 208. A similar situation will arise in the time-frequency resource grid corresponding to SF 1 of the original cell and SF 0 of the new cell, when the synchronization channel and the MIB of the new cell is transmitted over a number of resource elements. The overlapping resource elements then occurs when the original cell transmits its RS in the same time/frequency resource element as the synchronization channel and the MIB is transmitted. There will also be overlapping resource elements when RS for one cell and SIBS from another cell are transmitted over the same resource elements. However, a few collisions will not cause any problems, as the power amplifier is adapted to handle signals from all subcarriers at the same time in a high load situation, and will thus be able to handle these few collisions without saturating in a low load situation.

In a second exemplary embodiment of the present invention, it is a reconfiguration of the cell bandwidth that is triggered and initiated in the eNodeB. The cell bandwidth also affects the power consumption, and this second embodiment can therefore also be used to enable power savings. The eNodeB will thus start up a new cell with a lower bandwidth in parallel with the original one. In this embodiment the transmit format of the broadcast channel will not be affected, but otherwise the same considerations as in the first exemplary embodiment are needed.

Figure 3:
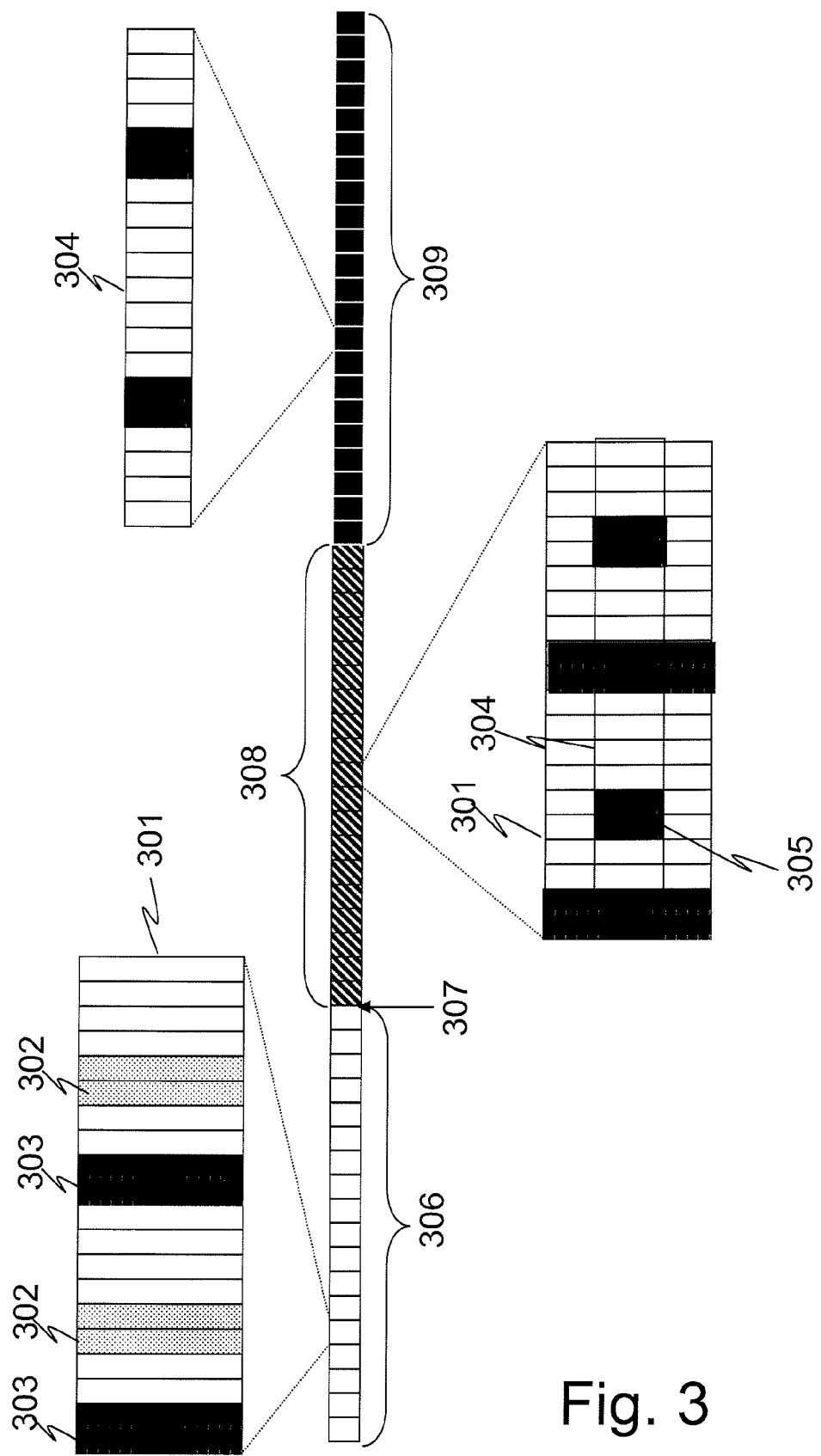
FIG. 3 illustrates schematically the method of the present invention according to one embodiment of the present invention.

FIG. 3 illustrates schematically the method of the second embodiment. This example furthermore assumes a power saving mode not currently defined in the LTE standard specifications release 8. In this power saving mode, which will probably be introduced in a later release of the LTE standard specifications, only SF 0 and 5 are used for transmission. In a first phase of the procedure 306, the eNodeB transmits a wideband carrier (the original cell). In each radio frame 301, two SF 303 (SF 0 and SF 5) are used for the transmission, and two SF 302 (SF 2 and 7) may thus be reserved for transmission to be used at the start up of the new cell. At a certain point in time 307 the new cell is started, and radio frames 304 of a second narrowband carrier are transmitted using the same transmission chain as the original wideband carrier, with a time offset of two SFs. The SFs used for transmission for the new cell 305, will thus correspond to the reserved SF 302. Since the original cell is in a power saving mode, a very low system load is assumed. Therefore it is possible to avoid simultaneous transmissions of both cells on the same time-frequency resources by applying such a time-offset between the two cells.

In a second phase of the procedure 308 which begins when the new cell is started 307, handover of UEs from the original cell to the new cell and reselection of the new cell are performed, and the transmit power of the signals of the original cell is ramped down, while the transmit power of the signals of the new cell is ramped up. When the original cell is completely shut down, the third phase 309 starts, and the eNB transmits radio frames 304 of one narrowband carrier corresponding to the new cell. The reconfiguration of the cell bandwidth is thus completed.

The advantage of these exemplary embodiments of the present invention is that they may be used instead of the slow and inflexible conventional system reconfiguration process for modifying SI described above, and they provide a quick reconfiguration whenever needed, not restricted to a slow procedure once every sixth minute. Power savings in the RBS is one reason for wanting to quickly change SI. If the purpose of the reconfiguration is to save power by reducing the bandwidth or the number of transmit antennas, then the reconfigurations could e.g. be done based on the load situation. As soon as the load situation allows it, power savings through a reduction of the bandwidth or the number of transmit antennas may be done. When measurements indicate that the capacity need is increasing again, a system reconfiguration for increasing the bandwidth or the number of transmit antennas may be triggered. The system may thus be reconfigured in a flexible and fast way, without disturbing the traffic, thus enabling power savings. Another advantage of the embodiments allowing a reconfiguration of the number of transmit antennas is that it is possible to do without having to restart the cell and thus cause disturbance in the ongoing traffic. The present invention is not limited to the reconfiguration of the number of transmit antennas or the bandwidth. Another example is to reconfigure the random access configuration, which may be done to cater for different random access loads.

When shutting down the original cell, this will typically not be done abruptly. In one embodiment of the invention, the transmission power of the signals for the original cell will be ramped down, whereas the transmission power of the signals for the new cell will be ramped up. As the active UEs in the original cell continuously measures the signal strength in order to decide when to make a handover to another cell, the ramping down of the signals for the original cell will initiate handovers for the active UEs. As the signals for the new cell are ramped up, the UEs are likely to make a handover to this new cell, although a UE close to the cell border may want to make a handover to a neighboring cell instead. Similarly, idle UEs will continuously search for the best cell to camp to through the cell reselection procedure, and will thus make a cell reselection to the new cell, when the transmission power of the original cell is ramped down and that of the new cell is ramped up.

To ensure that active UEs in the original cell will make the handover to the new cell, all active UEs are in one embodiment forced to connect to the new cell via a handover before the original cell is shut down. In the case of idle UEs, the UEs can be paged in the original cell and changed into active mode, in order to then force them to hand over to the new cell.

In one exemplary embodiment of the present invention, the trigger received by the RBS initiating the reconfiguration actually also comprises information about the new configuration. This means that the determination of the new configuration may be performed based on the information received in the trigger. In an alternative embodiment, the trigger received by the RBS is only a triggering message or an event indicating that an energy saving mode should be entered e.g., and the determination of the new configuration is then done based on a pre-determined configuration corresponding to this energy saving mode.

In order to save energy by reducing the power consumption, a decrease of the number of transmit antennas or the bandwidth for a cell in a business area could for example be done at a certain point in time in the evening, as traffic is normally lower there during night. In the morning the number of transmit antennas or the bandwidth could be increased again to cope with the increased capacity need. The trigger would in that case typically not comprise information about the new configuration, but would only be an event occurring at a certain point in time, and the RBS would read a pre-determined configuration information.

Another example would be that the RBS observes the load situation in the cell, averaged over a certain time, and changes to a pre-determined low load configuration when the load situation indicates that it is possible to do so. In still another example, a reconfiguration of the bandwidth would be initiated when some part of the system bandwidth gets heavily interfered for some reason.

Figure 4A:
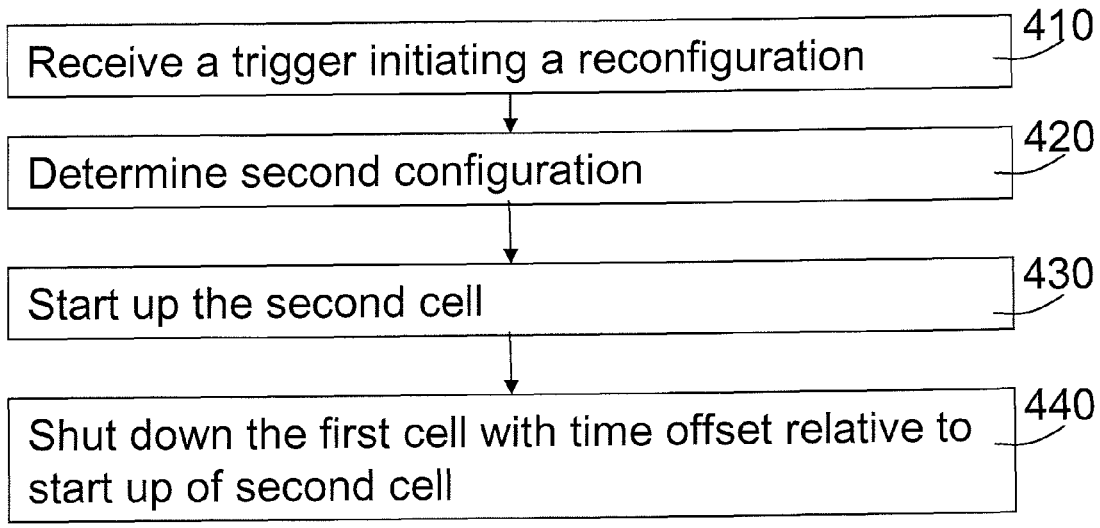
FIGS. 4a-d are flowcharts of the methods in the RBS according to embodiments of the present invention.

FIG. 4a is a flowchart of the method in the RBS according to one embodiment of the present invention. It comprises the steps of receiving 410 a trigger that initiates the system reconfiguration from a original first configuration to a new second configuration. When the trigger is received, either as an explicit reconfiguration message comprising the new configuration or as an event, the RBS determines the new configuration 420 either based on the configuration information received in the trigger or based on a pre-defined configuration information. The new cell is then started 430 by applying the new configuration, and the original cell is shut down 440 after a certain time delay. During the period when both cells are available, the transmission power of the signals of the new cell is ramped up and the transmission power of the signals of the original cell is ramped down. Active UEs are handed over from the original to the new cell and idle UEs make a cell reselection.

Figure 4B:
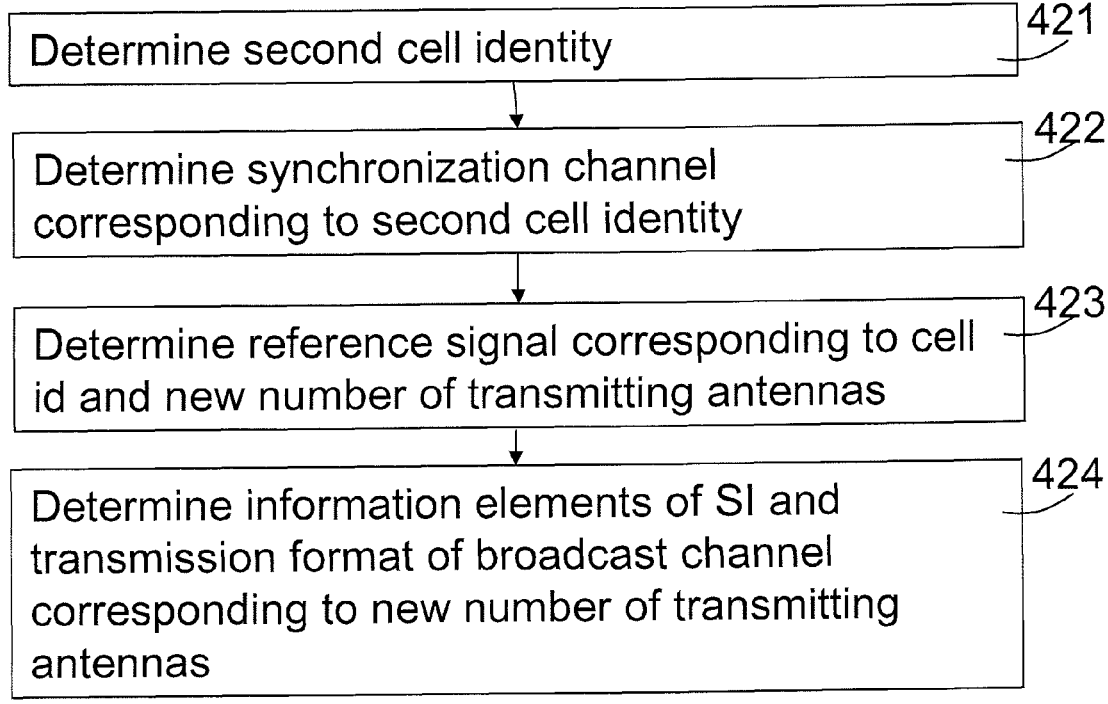

FIG. 4b is a flowchart of a part of the method in the RBS according to the first exemplary embodiment of the present invention described above. In this first embodiment it is a reconfiguration of the number of transmitting antennas that is triggered, and the step of determining the new configuration 420 comprises the following steps:

421: Determine a new cell identity. This step is important to avoid collision of the RS of the two cells, as the cell identity affects the RS frequency position (see step 423 below).
422: Determine a synchronization channel for the second cell that corresponds to the cell identity of the second cell.
423: Determine the RS for the second cell based on the cell identity as well as the new number of transmit antennas.
424: Determine the information elements of the SI and the transmission format of the BCH for the second cell corresponding to the new number of transmitting antennas. The BCH transmission format is adapted to the number of transmitting antennas in order for the UEs to detect how many transmitting antennas that are used.

Figure 4C:
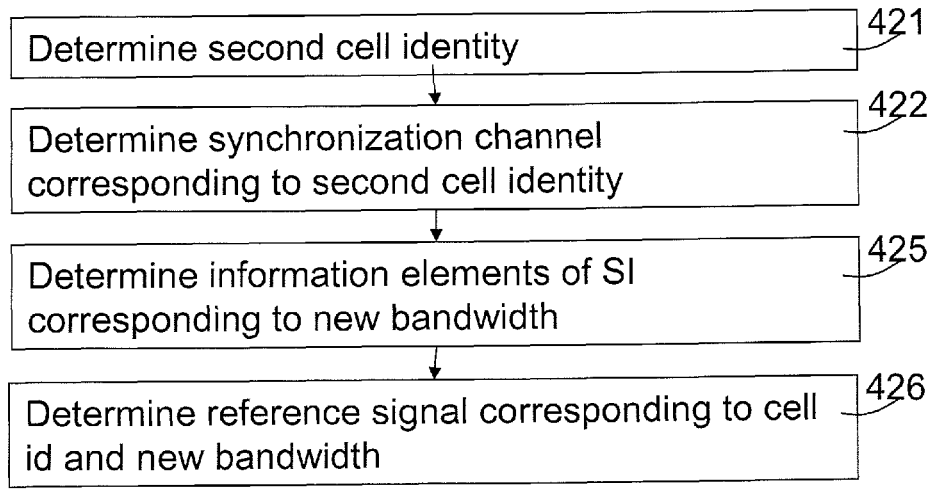

FIG. 4c is a flowchart of a part of the method in the RBS according to the second exemplary embodiment of the present invention described above. In this second embodiment it is a reconfiguration of the bandwidth that is triggered, and the step of determining the new configuration 420 comprises the following steps:

421: Determine a new cell identity. This step is important to avoid collision of the RS of the two cells, as the cell identity affects the RS frequency position (see step 423 below).
422: Determine a synchronization channel for the second cell that corresponds to the cell identity of the second cell.
425: Determine the information elements of the SI for the second cell. These should correspond to the new bandwidth.
426: Determine the RS for the second cell based on the cell identity as well as the new bandwidth.

Figure 4D:
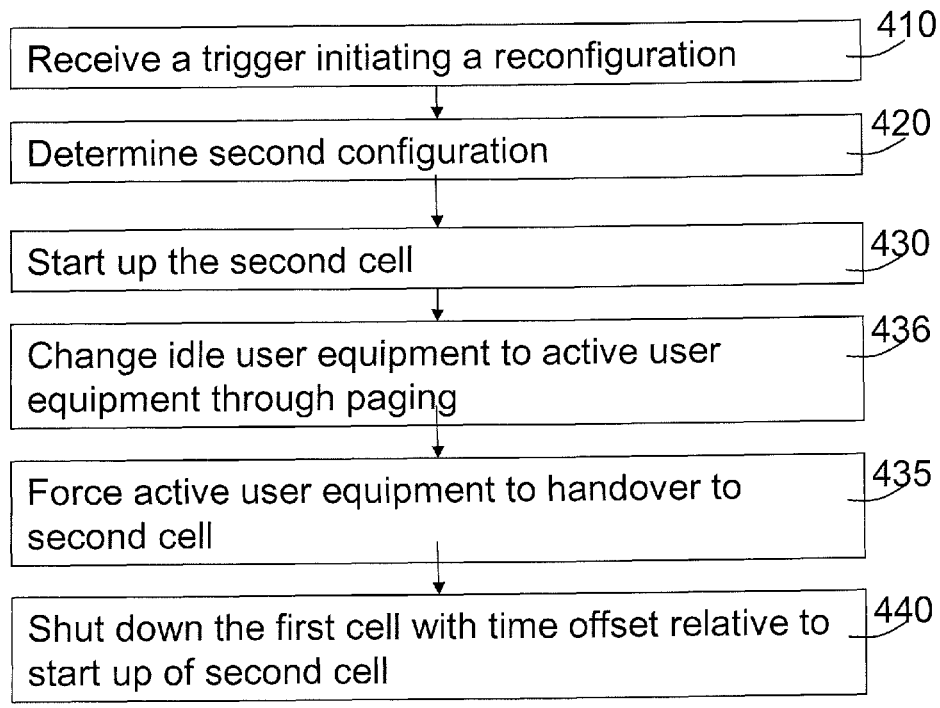

FIG. 4d is a flowchart of the method in the RBS according to a third embodiment of the present invention. It comprises the steps of receiving 410 a trigger that initiates the system reconfiguration from a original first configuration to a new second configuration. When the trigger is received, either as an explicit reconfiguration message comprising the new configuration or as an event, the RBS determines the new configuration 420 either based on the configuration information received in the trigger or on a pre-defined configuration information. The new cell is started 430, by applying the new configuration. Idle UEs are changed 436 into active UEs by paging them in the original cell, and before the original cell is shut down 440, all active UEs are forced 435 to handover to the new cell. This third embodiment ensures that all UEs in the original cell are handed over to the new cell before the original cell is shut down.

Figure 5:
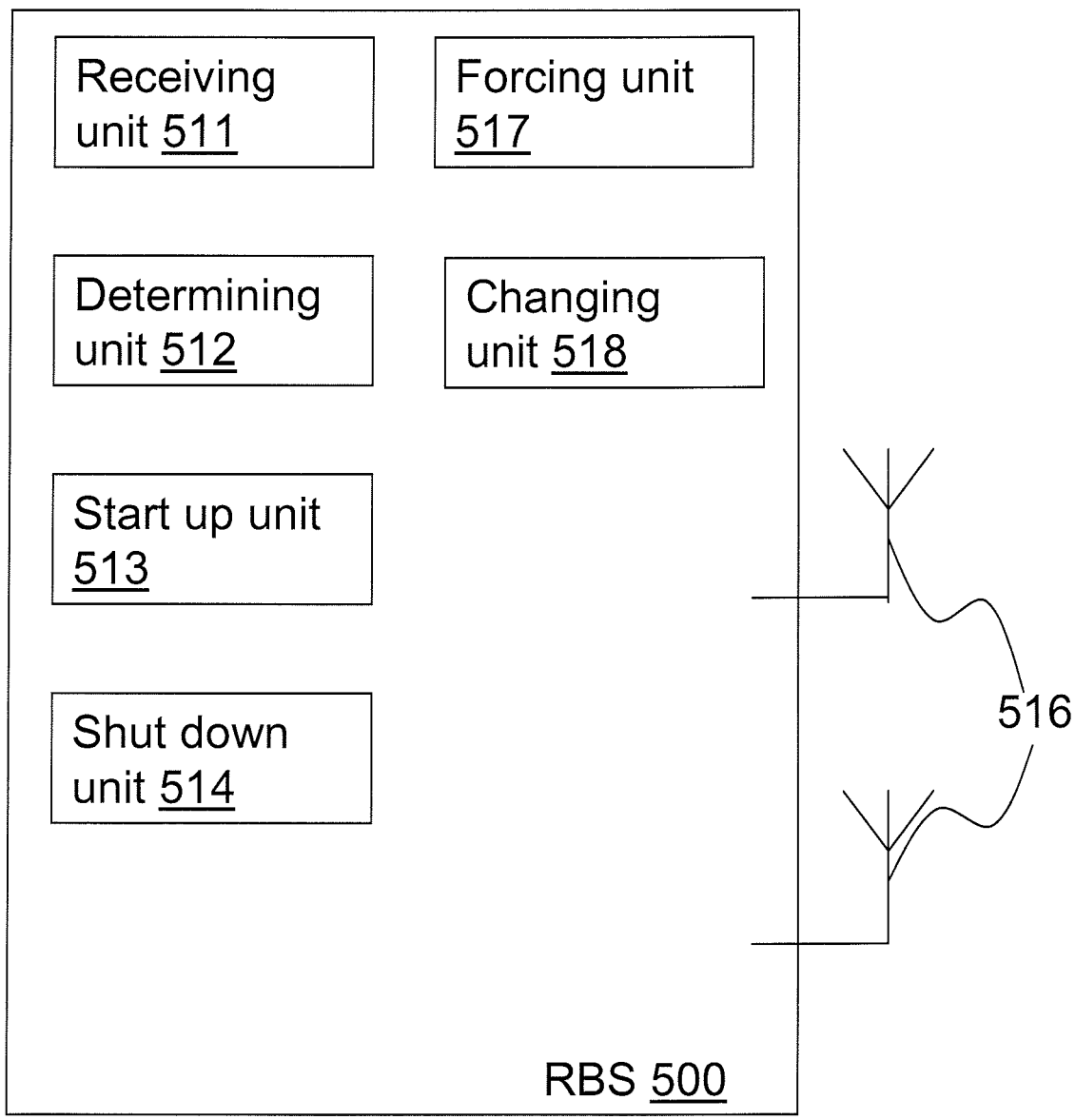
FIG. 5 illustrates schematically the RBS according to embodiments of the present invention.

Schematically illustrated in FIG. 5, and according to one embodiment of the present invention, is the RBS 500 comprising two transmitting antennas 516. It comprises a receiving unit 511 for receiving the trigger initiating the reconfiguration of the system. It also comprises a determining unit 512 for determining the new configuration, a start up unit 513 for starting up the new cell and a shut down unit 514 for shutting down the original cell.

When the trigger is initiating a reconfiguration of the number of transmitting antennas, the determining unit 512 is further arranged to determine—for the second cell—a cell identity, a synchronization channel that corresponds to the second cell identity, a reference signal that corresponds to the reconfigured number of transmitting antennas and to the second cell identity, and information elements of the system information and a transmission format of a broadcast channel that corresponds to the reconfigured number of transmitting antennas.

The trigger may also initiating a reconfiguration of the bandwidth, and the determining unit 512 is therefore also arranged to determine—for the second cell—a cell identity, a synchronization channel that corresponds to the second cell identity, information elements of the system information that correspond to the reconfigured bandwidth, and a reference signal that corresponds to the reconfigured bandwidth and to the second cell identity.

The start up unit 513 is in one embodiment arranged to ramp up the transmission power of a reference signal, a broadcast channel, a resource element carrying system information, and a synchronization channel for the second cell, and the shut down unit 514 is arranged to ramp down the transmission power of signals for the first cell.

Furthermore the RBS comprises a forcing unit 517 for forcing an active UE to hand over to the new cell and a changing unit 518 for changing all idle UEs associated with the original cell to active UEs, in order to be able to hand them over to the new cell.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method for system reconfiguration, in a radio base station, enabling changing from a first configuration to a second configuration, the radio base station being configured to broadcast cell configuration information comprised in System Information SI to user equipment, the method comprising:
   receiving a trigger initiating the reconfiguration of the system;
   determining the second configuration;
   starting up a second cell, before shutting down a first cell with the first configuration, by applying the second configuration; and
   shutting down the first cell with a time offset relative to starting up the second cell,
   wherein determining the second configuration comprises determining information elements of the SI for the second cell such that the SI that is broadcast in the second cell differs from the SI that is broadcast in the first cell.

2. The method according to claim 1, wherein the radio base station operates in an LTE system and is connected to at least two transmitting antennas, and the trigger is initiating a reconfiguration of a number of actively transmitting antennas, wherein determining the second configuration further comprises:
   determining a second cell identity;
   determining for the second cell, a synchronization channel that corresponds to the second cell identity;
   determining for the second cell, a reference signal that corresponds to the reconfigured number of transmitting antennas and to the second cell identity; and
   determining for the second cell, information elements of the SI and a transmission format of a broadcast channel that correspond to the reconfigured number of transmitting antennas.

3. The method according to claim 1, wherein the radio base station operates in an LTE system and the trigger is initiating a reconfiguration of a bandwidth, wherein determining the second configuration further comprises:
   determining a second cell identity;
   determining for the second cell, a synchronization channel that corresponds to the second cell identity; and
   determining for the second cell, information elements of the SI that correspond to the reconfigured bandwidth; and
   determining for the second cell, a reference signal that corresponds to the reconfigured bandwidth and to the second cell identity.

4. The method according to claim 1, wherein starting up the second cell comprises ramping up the transmission power of a reference signal, a broadcast channel, resource elements carrying SI, and a synchronization channel for the second cell.

5. The method according to claim 1, wherein shutting down the first cell comprises ramping down transmission power of signals for the first cell.

6. The method according to claim 1, wherein the trigger comprises information about the second configuration and wherein determining the second configuration is performed based on the trigger information.

7. The method according to claim 1, wherein determining the second configuration is performed based on a pre-determined second configuration information.

8. The method according to claim 1, further comprising forcing an active user equipment in the first cell to hand over to the second cell before shutting down the first cell.

9. The method according to claim 8, further comprising changing an idle user equipment in the first cell into an active user equipment through paging, before forcing the active user equipment in the first cell to hand over to the second cell.

10. The method according to claim 1, wherein determining the second configuration further comprises determining a second cell identity that differs from a cell identity of the first cell.

11. A radio base station adapted configured to enable system reconfiguration by changing from a first configuration to a second configuration, the radio base station further configured to broadcast cell configuration information comprised in System Information SI to user equipment, the radio base station comprising:
    a receiving unit configured to receive a trigger initiating a reconfiguration of the system;
    a determining unit configured to determine the second configuration;
    a start up unit configured to start up a second cell, before shutting down a first cell with the first configuration, by applying the second configuration; and
    a shut down unit configured to shut down the first cell with a time offset relative to starting up the second cell,
    wherein the determining unit is further configured to determine information elements of the SI for the second cell such that the SI that the radio base station is configured to broadcast in the second cell differs from the SI that the radio base station is configured to broadcast in the first cell.

12. The radio base station according to claim 11, configured to operate in an LTE system and connectable to at least two transmitting antennas, wherein the trigger is initiating a reconfiguration of a number of actively transmitting antennas, and the determining unit is further configured to determine a second cell identity, and for the second cell, a synchronization channel that corresponds to the second cell identity, a reference signal that corresponds to the reconfigured number of transmitting antennas and to the second cell identity, and information elements of the SI and a transmission format of a broadcast channel that correspond to the reconfigured number of transmitting antennas.

13. The radio base station according to claim 11, configured to operate in an LTE system, wherein the trigger is initiating a reconfiguration of a bandwidth, and the determining unit is further configured to determine a second cell identity, and for the second cell, a synchronization channel that corresponds to the second cell identity, information elements of the SI that correspond to the reconfigured bandwidth, and a reference signal that corresponds to the reconfigured bandwidth and to the second cell identity.

14. The radio base station according to claim 11, wherein the start up unit is configured to ramp up a transmission power of a reference signal, a broadcast channel, a resource element carrying SI, and a synchronization channel for said second cell.

15. The radio base station according to claim 11, wherein the shut down unit is configured to ramp down transmission power of signals for the first cell.

16. The radio base station according to claim 11, wherein the trigger comprises information about the second configuration wherein the determining unit is configured to determine the second configuration based on the trigger information.

17. The radio base station according to claim 11, wherein the determining unit is configured to determine the second configuration based on a pre-determined second configuration information.

18. The radio base station according to claim 11, further comprising a forcing unit configured to force an active user equipment in the first cell to hand over to the second cell before shutting down the first cell.

19. The radio base station according to claim 18, further comprising a changing unit configured to change an idle user equipment in the first cell into an active user equipment through paging.

20. The radio base station according to claim 11, wherein the determining unit is further configured to determine a second cell identity that differs from a cell identity of the first cell.

* * * * *

UNITED STATES PATENT AND TRADEMARK OFFICE
CERTIFICATE OF CORRECTION

PATENT NO. : 8,526,933 B2  
APPLICATION NO. : 13/380282  
DATED : September 3, 2013  
INVENTOR(S) : Baldemair et al.

Page 1 of 1

It is certified that error appears in the above-identified patent and that said Letters Patent is hereby corrected as shown below:

On the title page, item (73), under "Assignee", in Column 1, Line 2, delete "(publ) (SE)" and insert -- (publ), Stockholm (SE) --, therefor.

In the Specification

In Column 5, Line 52, delete "SIBS" and insert -- SIBs --, therefor.

In the Claims

In Column 9, Lines 30-31, in Claim 1, delete "System Information SI" and insert -- System Information (SI) --, therefor.

In Column 10, Line 8, in Claim 4, delete "the transmission" and insert -- transmission --, therefor.

In Column 10, Line 33, in Claim 11, delete "adapted configured" and insert -- configured --, therefor.

In Column 10, Line 37, in Claim 11, delete "System Information SI" and insert -- System Information (SI) --, therefor.

Signed and Sealed this  
Twenty-fifth Day of March, 2014

Michelle K. Lee  
*Deputy Director of the United States Patent and Trademark Office*